2,992,182
DESULFURIZATION OF RESIDUAL STOCKS
Eugene R. Elzinga, Scotch Plains, and John E. Idenden, Belleville, N.J., assignors to Esso Research and Engineering Company, a corporation of Delaware
Filed Apr. 23, 1959, Ser. No. 808,433
5 Claims. (Cl. 208—216)

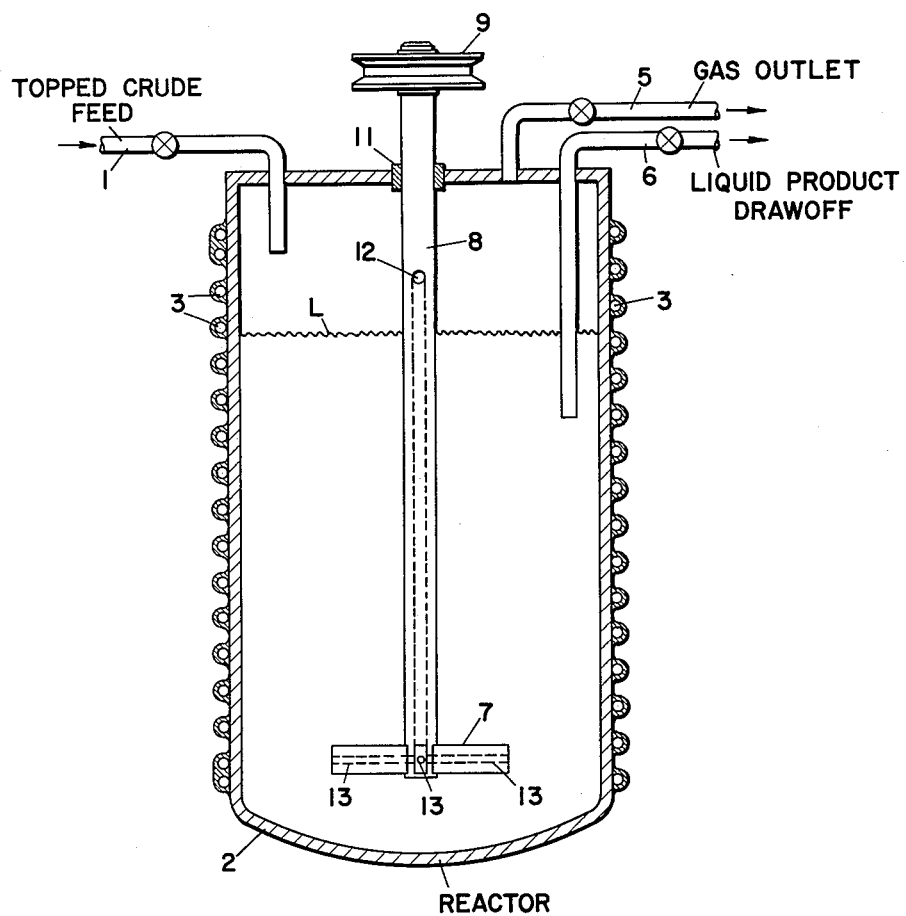

This invention relates to a process for desulfurizing heavy liquid petroleum fractions, such as topped crude, reduced crude, or residual stocks boiling mainly above 700° F. under conditions favoring formation of hydrogen gas and desulfurization by the gas thus produced in the presence of finely divided catalyst slurried in the liquid oil.

The cost of hydrogen gas is high for conventional hydrodesulfurization of residual petroleum stocks.

In the process of the present invention, the heavy or residual oil stocks are upgraded by considerable desulfurization and elimination of other impurities without the need of an extraneous hydrogen source. This is accomplished carrying the treatment of the oil under the right set of temperature and pressure conditions with sufficient internal recycling of gases and vapors produced and rapid mixing to obtain adequate contact of the gases, oil, and catalyst.

For adequate contacting required by the present process the autogenous gases and vapors have to be recontacted repeatedly with the oil and finely divided catalyst suspended in the oil, while the oil suspension of the catalyst is vigorously agitated in the reaction zone where the gases and vapors are reinjected. This means that the suspended catalyst does not have a chance to settle out from the oil undergoing reaction, since the catalyst particles are maintaind in as much of a turbulent motion as the liquid oil, gas, and vapors under forced circulation. This kind of turbulent operation is distinctive from those in which oil passes as a stream continuously through a bed of catalyst or carries suspended catalyst in a piston type flow substantially in one direction and permits settling out of the catalyst.

In operations demonstrating that the present process can be satisfactorily carried out to attain its advantageous results, a turbine agitated reactor with internal recycle of process gases and vapors was used. The turbine was run at high speeds in the range of approximately 300 to 900 r.p.m., preferably about 800 revolutions per minute.

The reactor used is illustrated diagrammatically in the drawing.

The reaction was carried out by charging a slurry of catalyst in oil through feed line 1 into reactor or reaction vessel 2 having external wall heaters 3 to maintain a desired temperature level throughout the reaction zone. Pressure was applied at startup and maintained in the reaction zone by admitting through line 1 some hydrogen gas recovered from gases vented through outlet 5. Finished liquid product containing suspended catalyst was removed through drawoff 6.

During the reaction, the turbine agitator vane 7 at the lower end of the control hollow shaft 8 was revolved at high speed by the revolving motor driven wheel 9 at the top of the shaft 8, the shaft protruding above the reactor cover 10 through a packing gland or seal 11. Gas and vapor were drawn into the hollow shaft from above the liquid level L through the port 12. The gas and vapor drawn down through the hollow shaft 8 were dispersed through gas exits 13 in the turbine vanes as very fine bubbles in the vigorously agitated slurry so as to give practically a homogeneous mixture of gas, vapors, catalyst and oil and creating a mixture of foam and liquid.

Modifications can be made in the apparatus described for rapid recirculation of the gas and vapor, and for their diffusion into a well stirred slurry of catalyst in oil to obtain high speed mixing radially downwardly, longitudinally, or multidirectionally. Auxiliary means can be provided for separating catalyst from the upgraded oil product, reactivating the catalyst, etc. The operation may be made continuous.

It has been determined that the operating conditions have to be selected with care to favor the formation of the correct amount of hydrogen without excessive coke formation. Suitable temperatures are within the range of 750° to 950° F., more preferably 850° to 950° F. For any temperature there is a particularly suitable pressure in the range of 50 to 400 p.s.i.g., a pressure of 100 to 150 p.s.i.g. being suitable for 800° F., the pressure being higher, i.e., in the range of 150 to 400 p.s.i.g. as the temperature is increased to preferred temperatures above 850° F., and below 100 p.s.i.g. if the temperature of reaction is decreased to below 800° F. However, there is a critical maximum total pressure at any of the useful reaction temperatures for limiting consumption of hydrogen and maintaining a major proportion of the oil in liquid phase.

Using finely ground cobalt molybdate on alumina catalyst (200–325 mesh) appropriate reaction conditions were determined for obtaining at least 50% desulfurization without consumption of hydrogen, minimum coke formation, and without excessive time. The tests made showed that the temperature of reaction should be maintained in the range of 750° to about 950° F. Outside this range, hydrogen is consumed and the operation is difficult to control for obtaining the desulfurization.

Experimental work has proved that an essential requirement for effecting the desulfurization in the heavy oils without consuming hydrogen is repeated recirculation of the gas and vapors made and subdividing of the gas and vapors into fine bubbles as they are mixed with the slurry to obtain homogeneous mixing during the reaction period. For example, the gas and vapor from a certain quantity of oil should be thus repeatedly redispersed in the same quantity of oil well mixed with the catalyst for at least 0.1 hour. The following example illustrates how the gas and vapor dispersion technique gives quick desulfurization without hydrogen consumption.

Example

A 90% Bachaquero residuum (10% light ends topped off), which has given difficulty in upgrading by conventional methods was charged to the reactor with 0.5 lb. $CoMoO_4$ on $Al_2O_3$ catalyst per pound of oil. This topped crude contained 27 wt. percent of hydrocarbons boiling in the range of 300° to 700° F. The charge was maintained for 0.1 hour with homogeneous redispersion of gas at 925° F. under a pressure of 350 p.s.i.g. There was no consumption of hydrogen during this period while the sulfur content of the oil was decreased 50% (2.8 wt. percent to 1.4 wt. percent). At the same time the naphtha insoluble asphaltene content was reduced from 9.7 wt. percent to 0.6 wt. percent. Although coke deposited on the catalyst was 10 wt. percent, this was not excessive. The coke is removed by burning from the catalyst which is separated, e.g., in a settler outside the reactor, and the catalyst is regenerated.

Carrying out the same procedure as in the foregoing example at lowered temperatures, e.g., down to below 750° F., and lowered pressures increases the contact time required many times, e.g., to more than 4 hours for the same amount of desulfurization and with adverse results with respect to $H_2$ consumpton. With prolonged contact time more cracking occurs producing naphtha and kerosene vapors which become mixed with the gases that are recirculated. Excessive amounts of such vapors lower the partial pressure of the hydrogen and prevent achievement of the desired results.

Although the cobalt molybdate on alumina catalyst is preferred, other compositions may be used, e.g., such as those which contain vanadia with molybdena, silica with the alumina support, or boria with the alumina support. In general, the active agents are 10 to 15% of $MoO_3$ and 2 to 5% CoO or the like on the support. Such hydrodesulfurizing catalysts and their preparations are known. For slurrying, the catalyst is in a powder form of usually 100 to 400 mesh size.

The catalyst loading should be as high as permitted without detriment to good agitation and accordingly may be in the range of 0.1 to 0.8 pound catalyst per pound of oil usually.

While the agitation and dispersion uses power, this cost is compensated for by shorter residence period and economy in not using up hydrogen. For instance, in a conventional fixed catalyst bed operation that involves treating a residuum under optimum conditions with 2800 cu. ft. of $H_2$/bbl. of oil to obtain 50% reduction in sulfur, 500 cu. ft. of the hydrogen is consumed and 2 hours' time of residence for the oil is required using a pressure of 800 p.s.i.g. and a temperature of 800° F. In this kind of operation the gas and oil are passed as a stream upwardly or downwardly through the fixed bed of catalyst.

The present method which essentially backmixes gases and vapors as they are formed from the heavy oil treated with additional agitation of the oil and redispersion of the gases and vapors as fine bubbles producing a foaming effect is distinguished from the old higher pressure "oil slurry" or "sump phase" processes.

In the slurry or sump phase operations, large amounts of hydrogen gas produced extraneously and separated from hydrocarbon products are passed through the reaction zone at a low linear velocity rate, e.g., 0.1 ft./sec. or less and the oil containing suspended solid flows upwardly at a slower rate. In these operations there is no substantial backmixing of gases, vapors with oil. Slurry operation reaction temperatures are generally 700° to 800° F. Their pressures are usually above 800 p.s.i.g. While such an operation permits addition and withdrawal of catalyst like the process of the present invention, it has the drawbacks of requiring hydrogen consumption, longer time of treatment, and lower severity of operation compared to the process of the present invention.

Although some stirring is obtained from recirculation of the gas and vapors, in the present kind of process the volume of gases and vapors recirculated is not high enough to give the agitation of the slurry required or to give the backmixing and turbulence of the slurry. Therefore, additional mechanical stirring is obtained by a high-speed internal propeller, impeller, or equivalent device for imparting turbulent motion to the slurry. With such additional agitation the displacement rate of the liquid oil in the zone of intimate contact is very fast, a matter of seconds or less than a minute for displacing one volume per volume of reaction space; whereas, with ordinary piston flow operations the displacement is of the order of one volume per volume of reaction space per hour. Under preferred conditions the residence time for the oil in the reaction zone is from approximately 0.1 to 0.5 hour.

The invention described is claimed as follows:

1. In catalytic desulfurization of a heavy petroleum oil feed stock with the aid of a finely divided hydrogenation catalyst slurried in the oil under conditions favoring formation of hydrogen gas and desulfurization of the oil by said hydrogen gas, the improvement which comprises repeatedly recirculating and redispersing hydrogen gas with vapors formed from the oil feed stock into intimate admixture with the oil slurry maintained in a reaction zone at a temperature in the range of 750° to 950° F. under a pressure of 50 to 400 p.s.i.g., while said oil slurry is additionally agitated into turbulent motion in the reaction zone to make the gas and oil slurry mixture homogeneous during a period that the oil is thus treated for lowering its sulfur content.

2. In catalytic desulfurization of a heavy petroleum oil boiling mainly above 700° F. with a finely divided hydrodesulfurization catalyst slurried in the oil under conditions favoring formation of hydrogen gas and desulfurization of the oil by said hydrogen gas, the improvement which comprises backmixing gas and vapors formed from the oil, dispersing the gas and vapors backmixed into the oil containing suspended catalyst as it is additionally agitated radially in turbulence to form a foam therewith, and maintaining the thus agitated foam and oil slurry mixture at 850° to 950° F. under a pressure of 200 to 400 p.s.i.g. during its period of treatment for desulfurization.

3. In catalytic desulfurization of a topped crude oil boiling mainly above 700° F. with a finely divided cobalt molybdate on alumina hydroresulfurization catalyst slurried in the oil under conditions favoring formation of hydrogen gas and desulfurization of the oil by said hydrogen gas, the improvement which comprises recirculating gas and vapors formed from the oil with oil-catalyst slurry in which a major portion of the oil is maintained in liquid phase, additionally turbulently agitating and backmixing the slurry into admixture with the recirculating gas and vapors dispersed as fine bubbles therein while maintaining the resulting turbulent mixture at 750° to 950° F. under a pressure in the range of 50 to 400 p.s.i.g. during a period that the oil is given a lowered sulfur content, the pressure being increased within said range as the temperature used is increased above 750° F.

4. In a process of catalytically desulfurizing a heavy liquid petroleum oil under conditions favoring formation of hydrogen gas with naphtha vapor from the oil and desulfurization of the oil by said gas in the presence of a hydrogenation catalyst slurried in the oil confined with a gaseous phase in a reaction zone, the improvement which comprises repeatedly recirculating the hydrogen gas and naphtha vapor internally in said zone into the liquid oil slurry maintained at about 750° to 950° F. under a pressure of about 50 to 400 p.s.i.g., additionally imparting turbulent motion and backmixing of the oil slurry as it is brought into intimate contact with the gas and vapor thus recirculated in the reaction zone to form a foaming mixture of the oil slurry with the gas and vapor thus recirculated in said zone.

5. In the process of claim 4, said gas and vapor being drawn down from above the liquid oil slurry in the reaction zone for recirculating and redispersion into the oil slurry additionally agitated into turbulent motion in said zone.

References Cited in the file of this patent

UNITED STATES PATENTS

| 545,756 | Ekenberg | July 16, 1895 |
| 1,157,988 | Koppers | Oct. 26, 1915 |
| 1,908,286 | Dorrer | May 9, 1933 |
| 2,174,510 | Gwynn | Oct. 3, 1939 |
| 2,706,167 | Harper et al. | Apr. 12, 1955 |

FOREIGN PATENTS

| 102,533 | Australia | Nov. 17, 1937 |